United States Patent [19]
Umstead et al.

[11] Patent Number: 5,841,068
[45] Date of Patent: Nov. 24, 1998

[54] MOUNTING DEVICE FOR MOUNTING AN ELECTRICAL COMPONENT IN A WALL

[76] Inventors: George H. Umstead, 803 Park Blvd.; Steven M. Umstead, 323 8th Avenue Juniata, both of Altoona, Pa. 16601

[21] Appl. No.: 372,077

[22] Filed: Jan. 12, 1995

[51] Int. Cl.⁶ .................................................. H02G 3/08
[52] U.S. Cl. ............................................................ 174/58
[58] Field of Search ................................ 174/59, 53, 58; 220/3.9, 3.6, 3.3; 248/205.1, 217.1, 217.2, 216.4; 52/220.1

[56] References Cited

U.S. PATENT DOCUMENTS

| | | | |
|---|---|---|---|
| 3,622,029 | 11/1971 | Ware | 220/3.7 |
| 3,928,716 | 12/1975 | Marrero | 174/57 |
| 3,977,640 | 8/1976 | Arnold et al. | 248/205 R |
| 4,019,647 | 4/1977 | Arnold | 220/3.3 |
| 4,747,506 | 5/1988 | Stuchlick, III | 220/3.9 |
| 4,971,280 | 11/1990 | Rinderer | 248/229 |
| 5,025,944 | 6/1991 | Rodick | 220/3.9 |

Primary Examiner—Kristine L. Kincaid
Assistant Examiner—Joseph Waks
Attorney, Agent, or Firm—Sterne, Kessler, Goldstein & Fox P.L.L.C.

[57] ABSTRACT

A device for a mounting electrical component includes a bracket and an electrical box. The bracket includes a U-shaped portion for being securely disposed to a stud or beam. An electrical box is mounted on the bracket. In one embodiment, the bracket may be configured such that an electrical box may be disposed on one side of the bracket facing in a first direction and a second electrical box may be disposed on the other side of the bracket facing in a second direction, which is opposite to the first direction. Thus, the first opening may be disposed on one side of a wall, while the second opening may be disposed on the second side of the wall. In the alternative, an electrical box in accordance with the invention may be used. The electrical box in accordance with the invention includes a first chamber having a first opening facing in a first direction and a second chamber having second opening facing in a second direction. The first and second directions are opposed. The first opening may be disposed on one side of a wall, while the second opening may be disposed on the second side of the wall.

20 Claims, 16 Drawing Sheets

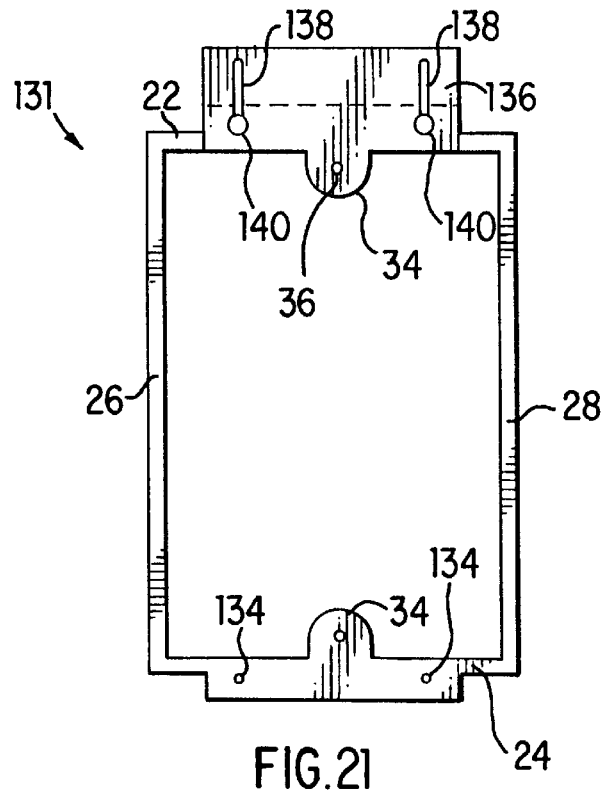
FIG.21
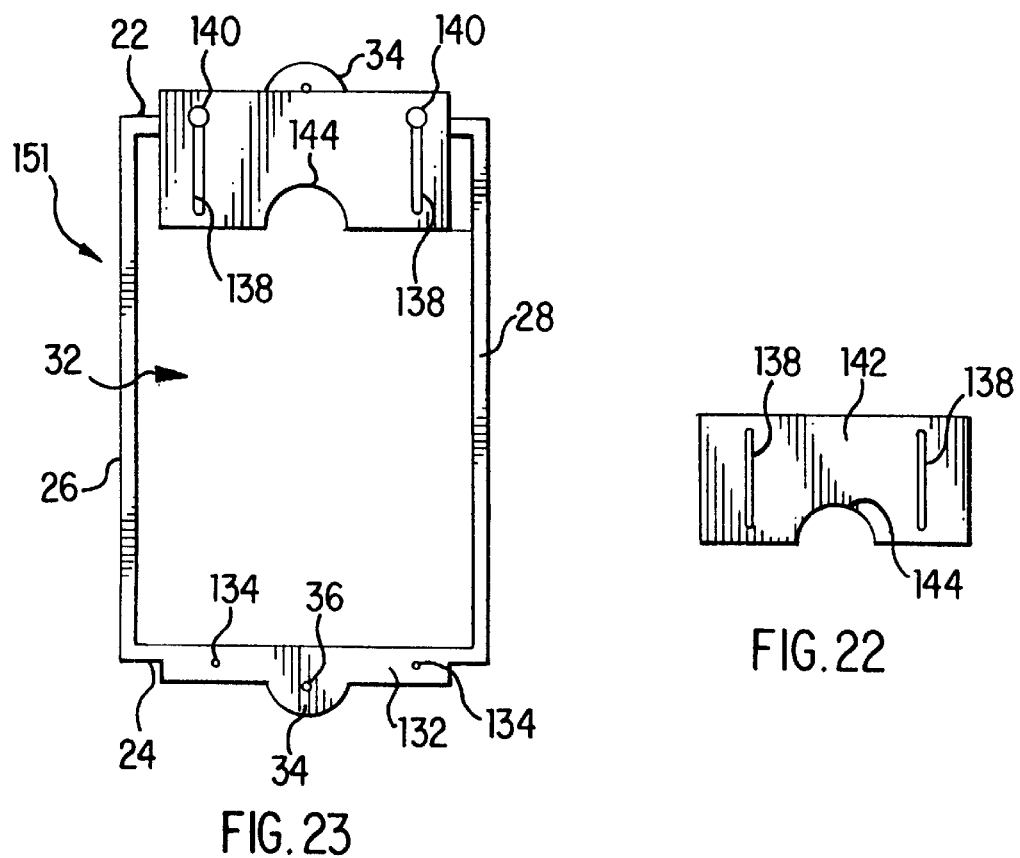
FIG.22
FIG.23 ns to shift. When shifting occurs, the electrical box will become misaligned, which may cause the electrical box, the wall switch or the wall plate to shift. Not only can this be aesthetically unappealing, it may cause electrical problems.

MOUNTING DEVICE FOR MOUNTING AN ELECTRICAL COMPONENT IN A WALL

BACKGROUND OF THE INVENTION

1. Field of the Invention

This invention relates to a device including a bracket and an electrical box for mounting an electrical component in a wall. More particularly, this invention relates to securing a bracket to a stud, as well as, efficiently providing electrical box access on both sides of a wall.

2. Description of Related Art

Generally, conventional electrical boxes are mounted in a wall by way of a flat or L-shaped bracket which requires the use of a hammer and nails. The electrical box may be disposed on the bracket before or after the bracket is mounted. However, with these conventional brackets, it is necessary to hold the bracket with one hand against a beam or a stud, while at the same time maneuvering to position a nail with the very same hand. Then, the other hand can be used to hammer the nail through an opening in the bracket so that the bracket can be secured to the beam.

Slight modifications to this conventional bracket mounting construction have been made. For example, the bracket may include spikes so that one hand can position the bracket against the stud while the other hand hammers the bracket so that spikes penetrate into the stud. Nonetheless, in either instance, it is cumbersome to have to hold the bracket with one hand while hammering with the other hand. None of the conventional brackets allow the user to mount the bracket with one hand.

Conventional electrical boxes, which are disposed on the brackets may comprise various configurations and dimensions, and may comprise single or multiple gang constructions. However, all conventional electrical boxes are constructed to have sides, a closed end and a single open end. The body of the electrical box is disposed in the wall. Only the single open end extends through the drywall for being accessed from one side of the wall. Accordingly, if a two-sided wall, i.e., an interior wall, requires switches or outlets on both sides, a first electrical box must be mounted with a bracket so as to open on one side of the wall and a second electrical box must be mounted with a separate bracket so as to open on the other side of the wall.

Conventional electrical boxes may include mounting ears on an exterior surface of the electrical box to secure the box to the drywall. Mounting ears are generally L-shaped and of a one-screw or a two-screw design. A first leg of the mounting ear is fastened on the exterior of the electrical box by screw(s) prior to installing the drywall or plaster wall. A second leg extends away from the electrical box and along a same plane as the open face. When in position, the second leg abuts against the outside surface of the drywall. With this type of mounting ear, it is difficult to install the drywall around the mounting ears. In addition, once the drywall or plaster is installed, the mounting ears cannot be easily removed without removing the entire electrical box because the screws are behind the drywall or plaster and are therefore inaccessible.

Over time, the studs, the wall, and the entire building have a tendency to settle. As they settle, the nails may shift or "pop" and the screws may loosen. As a result, conventional mounting brackets and electrical boxes may have a tendency to shift. When shifting occurs, the electrical box will become misaligned, which may cause the electrical box, the wall switch or the wall plate to shift. Not only can this be aesthetically unappealing, it may cause electrical problems.

Accordingly, it is an object of the invention to provide a means for mounting an electrical box that can be simply and securely fitted on a beam or a stud with the use of only one hand and, initially, without the use of nails or spikes.

Another object of the invention is to provide an electrical box that can accommodate electrical switches on both sides of a wall while requiring the work and supplies for mounting only a single electrical box.

Another object of the invention is to provide a stationary positioning tab to prevent shifting of the electrical box.

Another object of the invention is to provide an adjustable positioning tab for securing the electrical box to the drywall or plaster wall.

SUMMARY OF THE INVENTION

In accordance with the invention, a device for mounting electrical components is provided. The device includes a bracket and an electrical box. The bracket includes a base, a first leg and a second leg defining a U shape. The first and second legs are biased toward each other. A stud is secured in the U shape of the bracket. The electrical box is connected to the bracket.

In particular, the bracket may be configured to mount an electrical box opening on opposing sides of a wall. In particular, a first electrical box may be disposed on one leg of the bracket having an opening facing in a first direction and a second electrical box may be disposed on the other leg of the bracket having an opening facing in a second direction different from the first direction. When the bracket is secured on the stud, the first opening will be disposed on one side of the wall and the second opening will be disposed on the other side of the wall.

More particularly, an electrical box in accordance with the present invention may be mounted on the bracket. The electrical box includes a first chamber and a second chamber. The first chamber has a first opening facing in a first direction and a second chamber having a second opening facing in a second direction different from the first direction. Accordingly, the first opening may be disposed on one side of the wall and the second opening may be disposed on the other side of the wall. Therefore, the electrical box in accordance with the invention may provide access on two sides of a wall with the use of only a single electrical box.

BRIEF DESCRIPTION OF THE FIGURES

The accompanying drawings, which are incorporated in and form a part of the specification, illustrate different embodiments of the present invention and, together with the description, serve to explain the principles of the invention. In the drawings:

FIG. 21 is a front view of the electrical box and adjustable positioning tabs of FIG. 20 having the adjustable positioning tab in an extended position;

FIG. 22 is a front view of a modified embodiment of the adjustable positioning tab shown in FIG. 18;

FIG. 23 is a front view of an electrical box with the adjustable positioning tab shown in FIG. 22 mounted thereon in a retracted position.

DETAILED DESCRIPTION OF PREFERRED EMBODIMENTS

Figure 1:
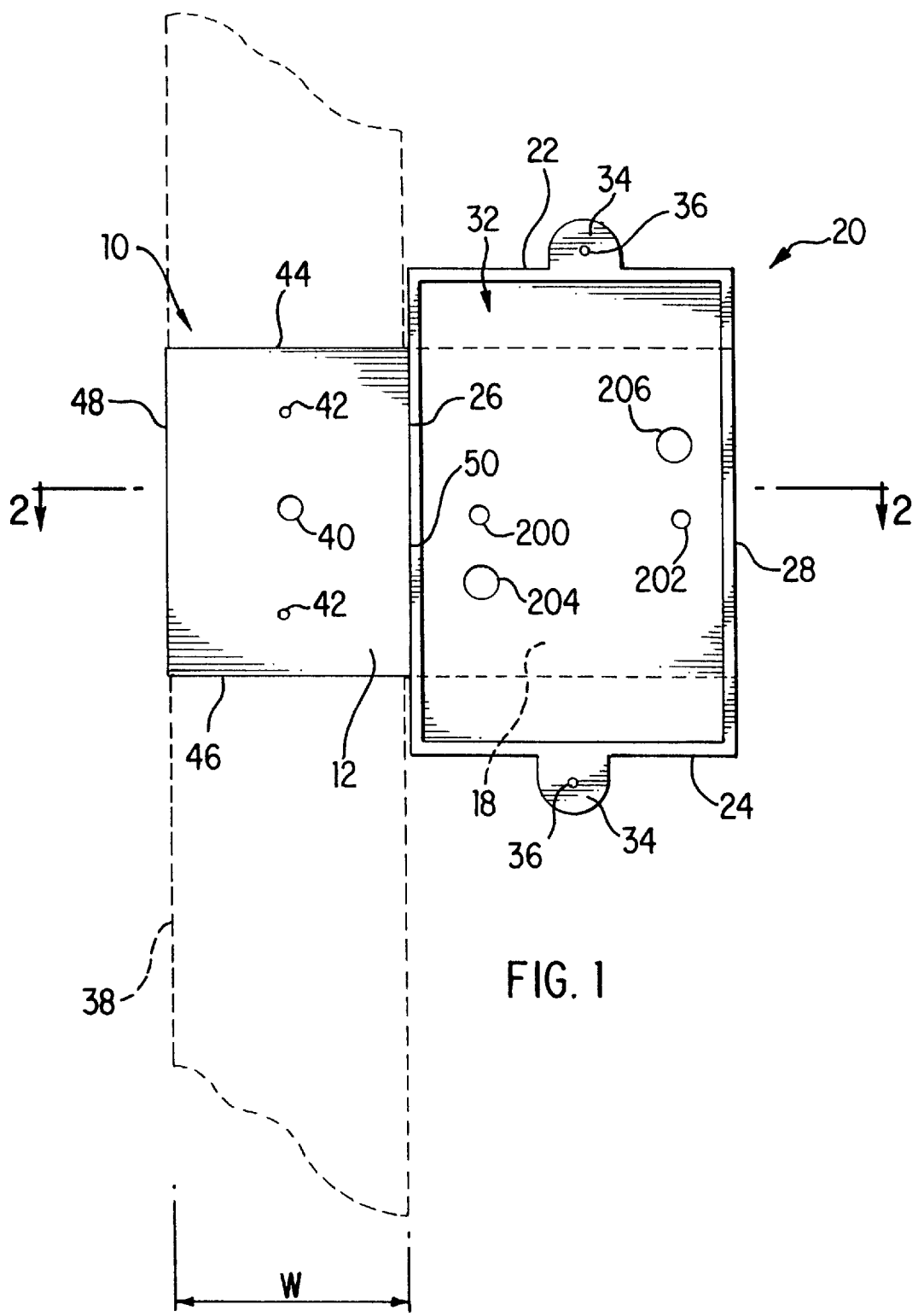
FIG. 1 is a front view of an electrical box mounted on a bracket in accordance with the invention.

With reference to the drawing figures in which similar reference numbers are used to describe similar elements, a device is shown for mounting electrical boxes for electrical components such as cables, fiber optic cables, telephone wires and jacks, switches, outlets and receivers in a wall. It is understood that the invention may be used to mount non-electrical components as well.

The wall in which the device is mounted may be any conventional type of wall made with studs or beams covered by drywall or plaster and may be one-sided or two-sided. The wall need not necessarily be a vertical wall, but may be a wall of any orientation, including a ceiling or a floor.

Figure 2:
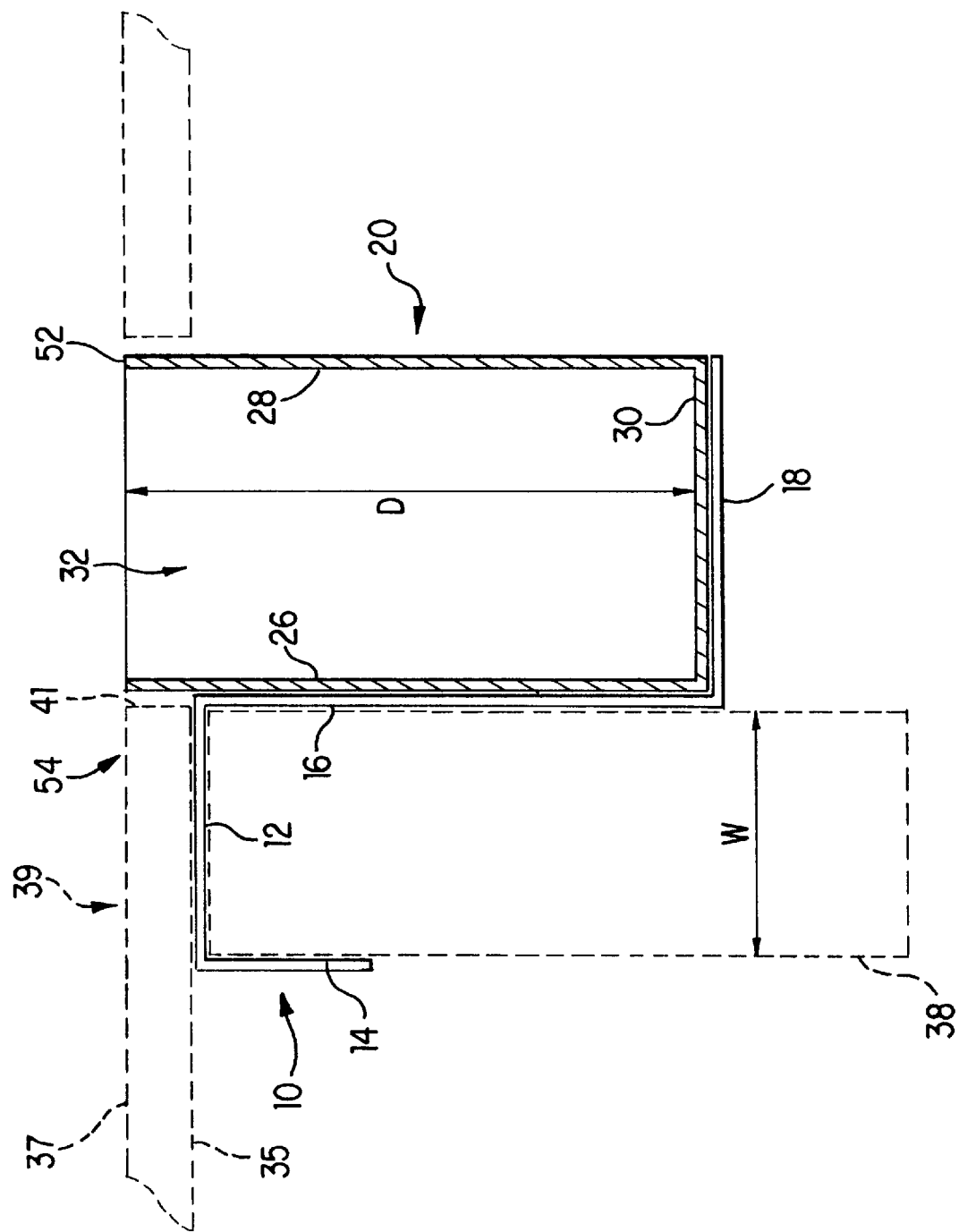
FIG. 2 is a cross-sectional view taken along line 2—2 of FIG. 1.

As shown in FIGS. 1 and 2, the mounting device of the present invention includes a bracket shown generally at 10 and an electric box shown generally at 20, which is disposed on bracket 10.

Bracket 10 includes a base 12 with a first leg 14 extending from base 12 substantially perpendicular thereto and a second leg 16 also extending from the same side of base 12 as first leg 14 and substantially perpendicular to base 12. As shown, first leg 14 and second leg 16 extend substantially parallel to each other and are biased toward each other at the point where each leg joins base 12. In the alternative, first and second legs 14 and 16 of bracket 10 may be canted inward towards each other such that the angle between first leg 14 and base 12, and second leg 16 and base 12 is less than ninety degrees.

It is also within the scope of the invention to have a user, on location or on site, tailor bracket 10 by bending first and second legs 14 and 16 of bracket 10 towards each other prior to installation on stud 38. This tailoring of bracket 10 ensures a secure and tight engagement between bracket 10 and stud 38. In addition, this ability to tailor bracket 10 also enables bracket 10 to be customized to fit on and accommodate various sized studs.

Base 12, first leg 14 and second leg 16 define substantially a U-shape. The U-shape of bracket 10 corresponds to the shape of a conventional "2×4" wooden stud 38. For example, if bracket 10 is to be disposed on stud 38 having a width W of one and one-half inches, bracket 10 may be formed to have a corresponding interior width between first leg 14 and second leg 16 of one and one-half inches. Although bracket 10 is shown in the Figures as monolithic, bracket 10 may comprise several individual components joined together. Alternatively, base 12, first leg 14, second leg 16 or flange 18 may be varied in length and dimension, or in relative orientation with respect to each other so long as bracket 10 may be securely fixed to various types of studs in accordance with the present invention. Bracket 10 is preferably formed of sheet metal, steel or plastic having good strength and memory characteristics.

In the present invention, bracket 10 is disposed on stud 38 by expanding first and second legs 14 and 16 and fitting stud 38 into the U shape of bracket 10. When bracket 10 is positioned on stud 38, and first and second legs 14 and 16 are released, they spring back to their original position, whereby stud 38 is secured between first and second legs 14 and 16 of bracket 10.

The pressure exerted by first and second legs 14 and 16 against stud 38 is sufficient to secure bracket 10 in a fixed position on stud 38. No additional means of securement is necessary. Therefore, a user may simply and easily dispose bracket 10 onto stud 38 without requiring the use of any tools. In particular, a user of the present invention does not have to juggle a conventional bracket or bracket and nail, in one hand while using a hammer in the other hand to pound the nail into the stud to secure the electrical box to the stud. Such extreme force and tools are not necessary in accordance with the invention. In contrast, with the present invention, bracket 10 can be simply and easily fixed onto stud 38, then, when the user conveniently has both hands free, the user may use a hammer and nail to permanently secure bracket 10 to stud 38.

Figure 4:
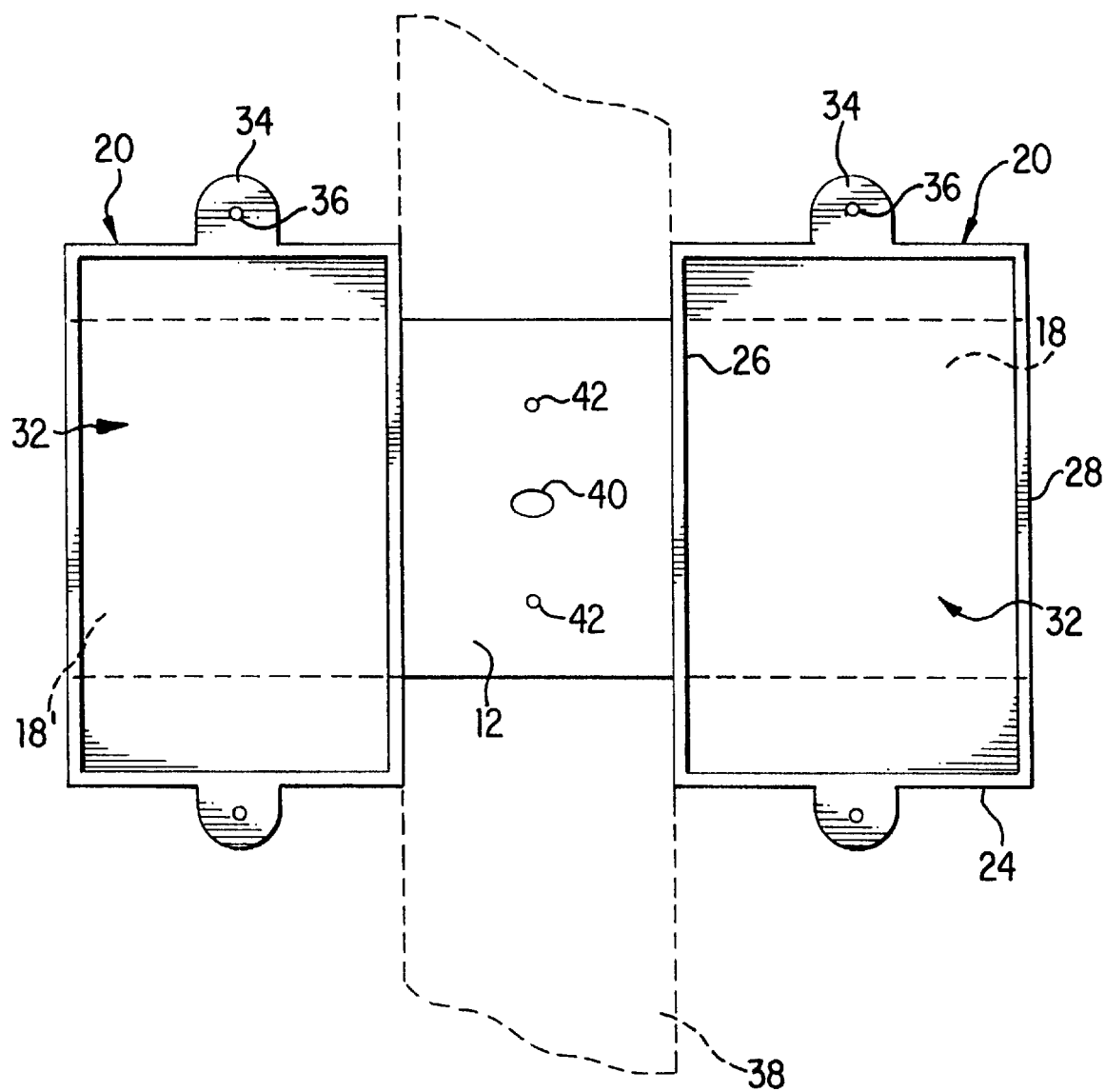
FIG. 4 is a front view of the bracket shown in FIG. 3 and having two electrical boxes mounted thereon.

To accommodate a supplemental means of securement such as a nail, two apertures 42 are disposed in base 12 of bracket 10 (FIG. 4). Each aperture 42 is configured to receive, for example, a nail or screw. Apertures 42 are positioned on base 12 such that, when measured from a center of its origin, each aperture is disposed ⅜ of an inch from the top edge 44 or the bottom edge 46 of base 12. Apertures 42 may be centered between first side edge 48 and second side edge 50 of base 12. Although two apertures 42 are shown in the Figures, a single aperture may be provided.

Second leg 16 includes a flange 18 which extends from an end of leg 16 opposite to base 12. Flange 18 is generally parallel to base 12, forming an L-like shape. Electrical box 20 is disposed in an area defined between second leg 16 and flange 18. As shown, flange 18 extends from second leg 16 a distance substantially equal to a width of the rear wall 30 of electrical box 20. Second leg 16 extends from base 12 slightly less than the depth D of electrical box 20, such that, the front end 52 of electrical box 20 extends beyond base 12 of bracket 10 by a distance approximately equal to the thickness of drywall sheet 39.

Electrical box 20 may be connected to either flange 18 or second leg 16 by any standard type of mechanical connection. For example, electrical box 20 may be connected to bracket 10 by adhesive, bolts or screws such that electrical box 20 may be selectively connected and disconnected from bracket 10. In the alternative, bracket 10 and electrical box 20 may be integrally formed by molding, for example, such that bracket 10 and electrical box 20 are monolithic (see FIG. 24).

Figure 16:
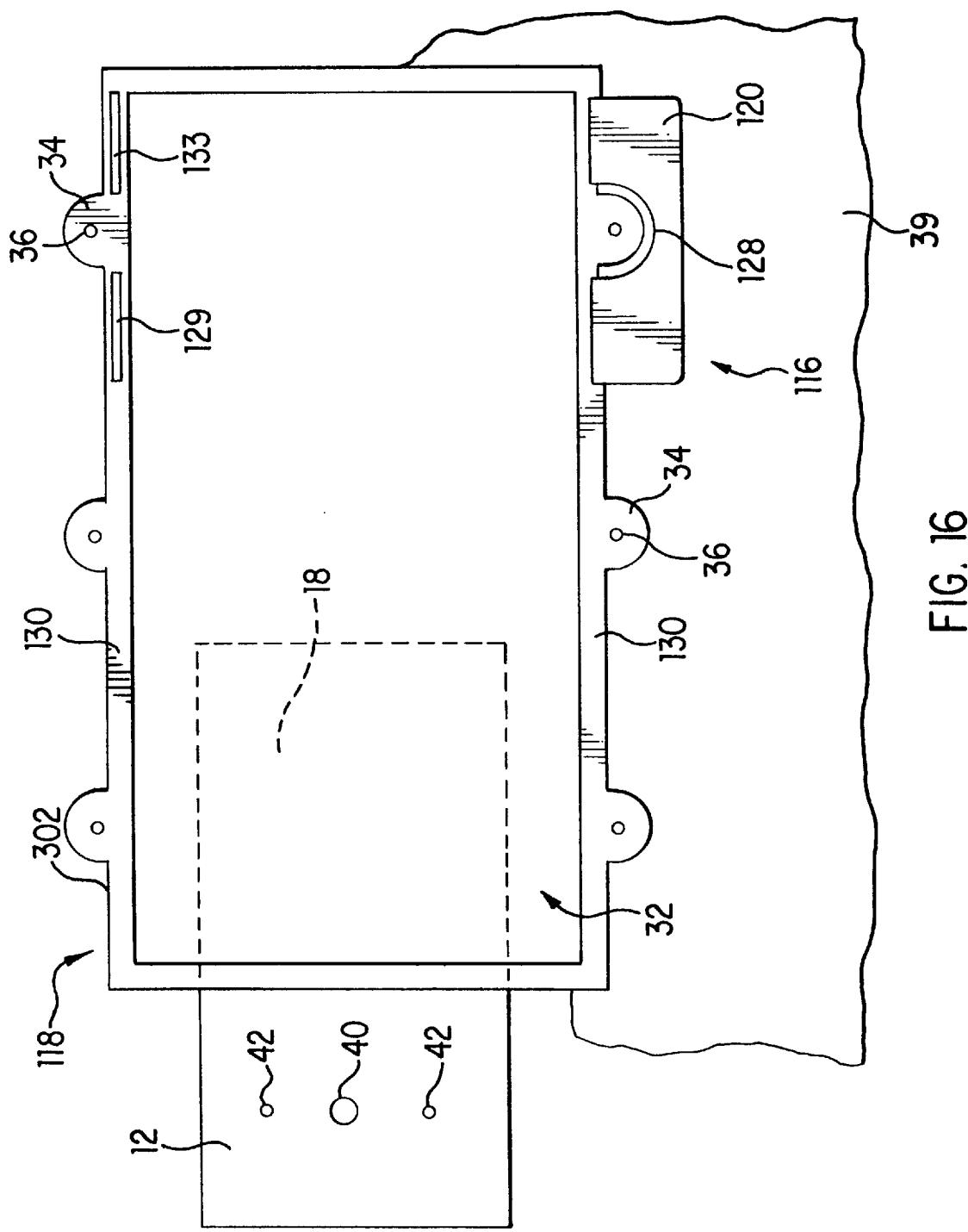
FIG. 16 is a front elevational view of the bracket of FIG. 1 with a multi-gang electrical box having an adjustable positioning tab in accordance with the present invention.

Electrical box 20 serves as a means for mounting electrical components and may include a conventional electrical box, as shown in FIGS. 1 and 2 for example, or an electrical box according to the present invention, as discussed below. The conventional electrical box 20 as shown is generally rectangular. In the alternative, the electrical box may be any configuration such as square, round or circular. Electrical box 20, as shown, includes a top wall 22, a bottom wall 24, a first side wall 26, a second side wall 28, and a rear wall 30. The front of electrical box 20, opposite to rear wall 30, includes a generally rectangular opening 32. Electrical box 20 (as shown in FIGS. 1 and 2) is a single gang electrical box. However, a double or multiple gang electrical box (as is shown in FIG. 16 for example) may also be used. Electrical box 20 may be made of any durable material such as metal or plastic. Electrical box 20 may comprise any standard dimensions and may have a depth D suitable for the particular requirements of the intended use. Preferably, the overall volume of electrical box 20 is eighteen cubic inches.

Figure 7:
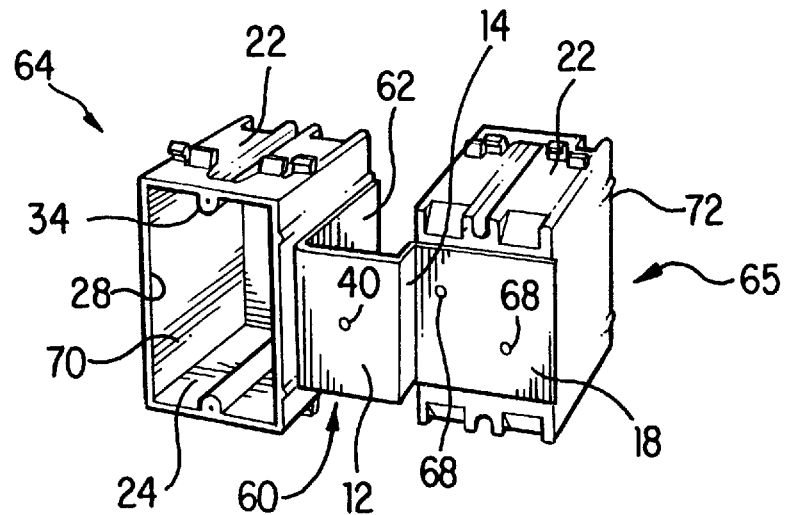
FIG. 7 is a front view of another embodiment of a bracket in accordance with the present invention with two electrical boxes mounted in opposing directions.
Figure 8:
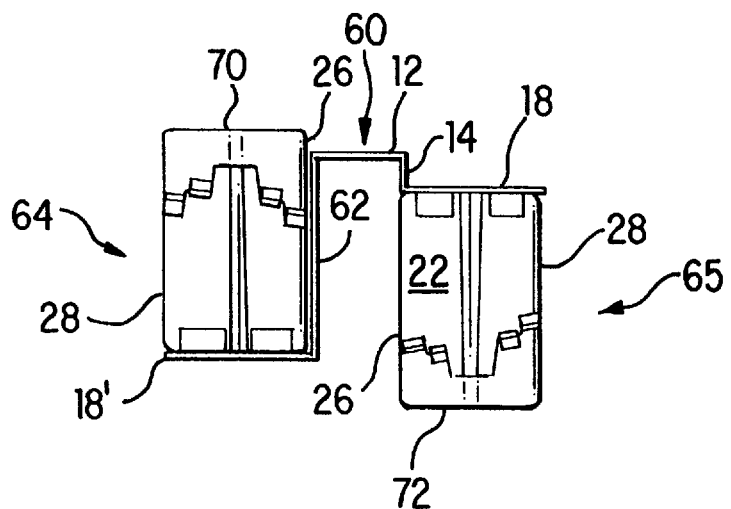
FIG. 8 is bottom plan view of the bracket and electrical boxes of FIG. 7.
Figure 9:
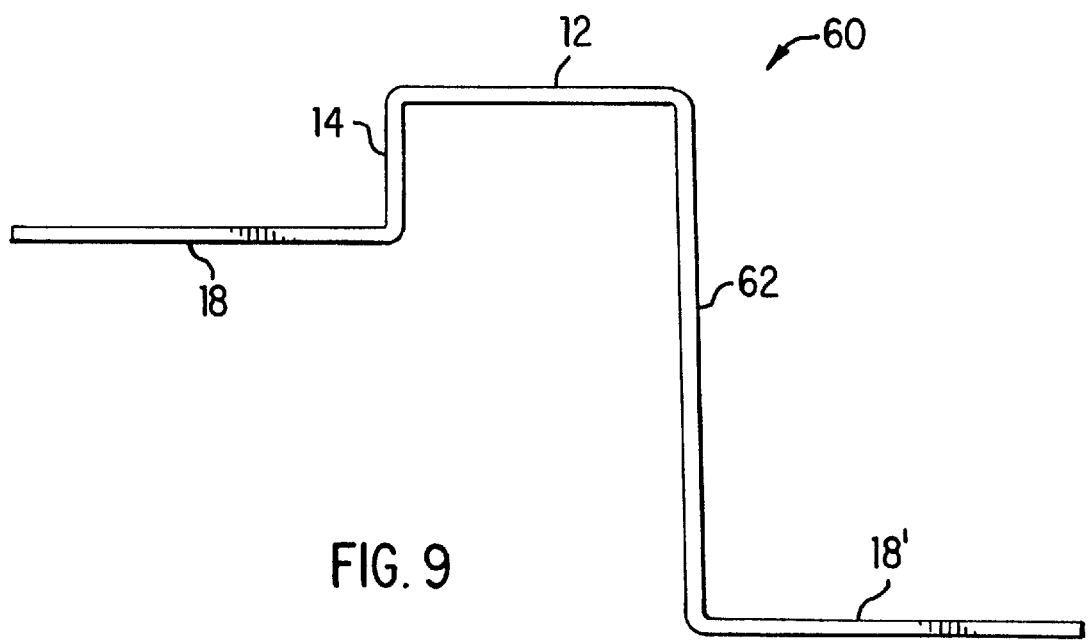
FIG. 9 is a top plan view of the bracket of FIG. 7.

Top wall 22 and bottom wall 24 of electrical box 20 each include an arcuate protrusion 34 with a centrally disposed aperture 36 for receiving a nail or screw. The nail or screw may be passed through aperture 36 of protrusion 34 so as to penetrate into a structure behind electrical box 20, thereby providing supplemental support to electrical box 20, if needed. Protrusion 34 may be disposed on an exterior surface of both top and bottom walls 22 and 24 (as shown) or may be disposed on an interior surface of both top and bottom wall 22 and 24 (shown in FIGS. 7 and 8). Protrusion 34 may extend the full width of top and bottom walls 22 and 24.

Rear wall 30 of electrical box 20 includes prepunched apertures 200, 202, 204 and 206 to accommodate screws, for example, for connecting electrical box 20 to flange 18 of bracket 10, as discussed above. Prepunched apertures 200, 202, 204 and 206 may correspond to similar prepunched apertures (not shown) in flange 18 of bracket 10. Generally, electrical box 20 will include only one set of prepunched apertures 200 and 202 or prepunched apertures 204 and 206. Preferably however, flange 18 of bracket 10 includes all four prepunched apertures 200, 202, 204 and 206, such that bracket 10 may be compatible with many standard electrical boxes available in the industry.

Apertures 200 and 202 are disposed along a same horizontal line, while apertures 204 and 206 are offset from the same horizontal line. Specifically, aperture 200, measured from a center of its origin is preferably disposed $11/32$ of an inch inward from first side wall 26 and 1 ½ inches from top wall 22. Aperture 202 is preferably disposed $11/32$ of an inch inward from second side wall 28 and 1 ½ inches from bottom wall 24. Aperture 204, measured from a center of its origin is preferably disposed $3/8$ of an inch inward from first side wall 26 and $1/16$ of an inch from bottom wall 24. Aperture 206 is preferably disposed $3/8$ of an inch inward from second side wall 28 and 1 $15/16$ of an inch from bottom wall 24.

In addition, an alignment aperture 40 is disposed in base 12 of bracket 10 along the same horizontal line as apertures 200 and 202 in electrical box 20. Alignment aperture 40 facilitates alignment of bracket 10 on stud 38. For example, a chalk line may be measured along a series of studs 38 and aperture 40 of several brackets 10 can be aligned with the chalk line such that a series of brackets 10 may be disposed at the same height from the ceiling or floor. Accordingly, when bracket 10 is disposed over this chalk line, the chalk line may be viewed through alignment aperture 40 and centered therein.

Bracket 10 is mounted on stud 38 as discussed above. Once bracket 10 is mounted on stud 38, a drywall sheet 39 is disposed over stud 38, bracket 10 and electrical box 20. In particular, bracket 10 is disposed behind drywall sheet 39 and electrical box 20 is disposed such that a portion of electrical box 20 passes through an opening 41 formed in drywall sheet 39. Open end 32 of electrical box 20 is substantially flush with an exterior side 37 of drywall sheet 39 and is accessible from exterior side 37 of drywall sheet 39. Opening 41 in drywall sheet 39 and open end 32 in electrical box 20 may be covered by a conventional cover or switch plate (not shown).

Figure 3:
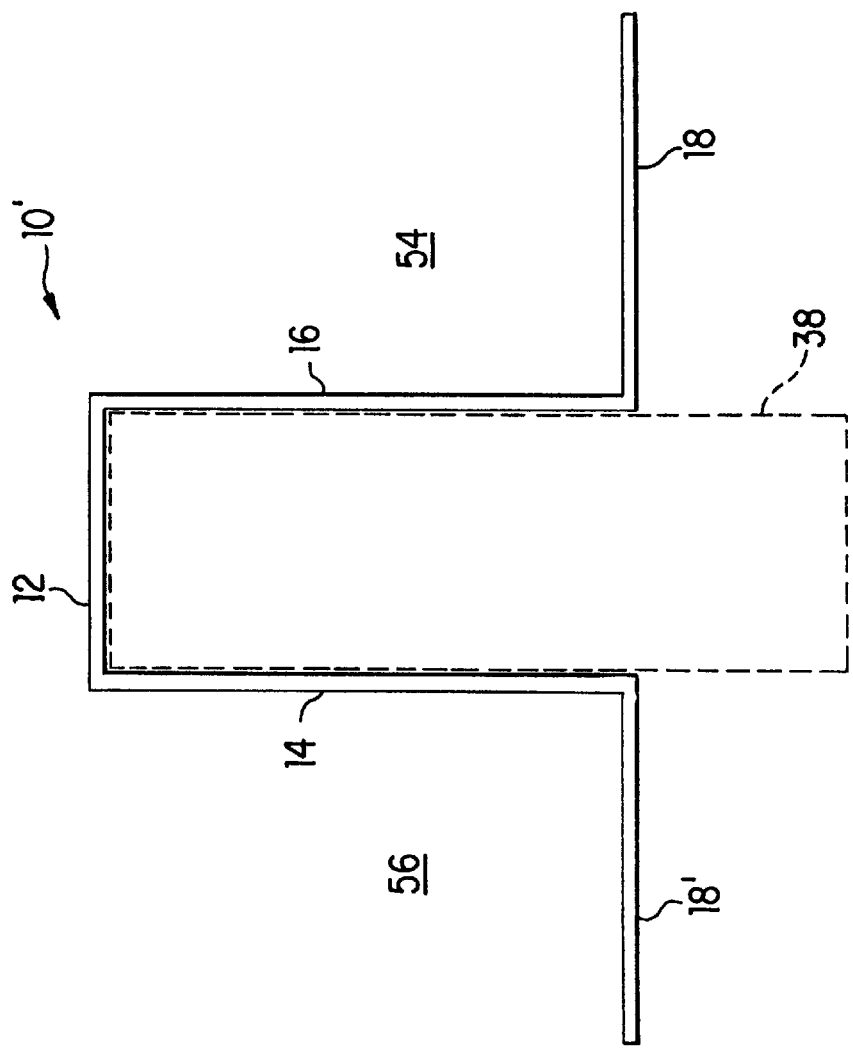
FIG. 3 is a modified embodiment of a bracket in accordance with the present invention adapted to have two electrical boxes mounted thereon.

Referring now to FIGS. 3 and 4, a second embodiment of the present invention is shown. In this embodiment, one bracket shown generally at 10' may mount two electrical boxes 20. Bracket 10' is substantially identical to bracket 10, however, in this embodiment first leg 14 is longer and includes a second flange 18' extending from first leg 14 substantially parallel to base 12 and in a same plane as first flange 18. Second leg 14 is substantially perpendicular to second flange 18'. Second leg 14 and second flange 18' define an area 54 therebetween for receiving a first electrical box 20. A second area 56 is defined between first leg 16 and first flange 18 for receiving second electrical box 20. Otherwise, the embodiment of FIGS. 3 and 4 is identical to the embodiment of FIGS. 1 and 2 discussed above.

Figure 5:
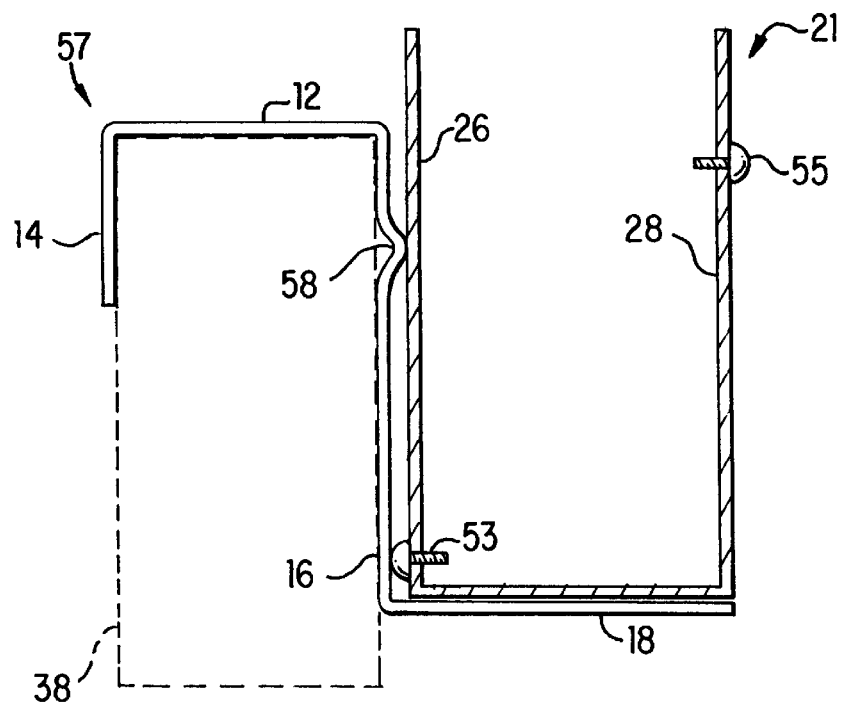
FIG. 5 is a modified embodiment of the bracket shown in FIG. 1 adapted to accommodate a conventional metal electrical box.

Referring now to FIG. 5, a further modified embodiment of the bracket of the present invention is shown. Bracket 57 is substantially identical to bracket 10 discussed above, however, it includes a nub 58 formed on second leg 16. Nub 58 is integrally formed with bracket 57 by machine stamping nub 58 into second leg 16. Nub 58 is provided for spacing a conventional metal electrical box 21 from bracket 57. In particular, conventional metal electrical box 21 includes a screw 53 and a screw 55 disposed diagonally across electrical box 21 from screw 53. Screw 53 and 55 pass through apertures in side walls 26 and 28, respectively. The head of each screws 53 and 55 is disposed on the exterior surface of conventional metal electrical box 21.

The purpose of screws 53 and 55 is to connect a series of conventional metal electrical boxes 21 together. This is done by: (1) removing one screw, for example, screw 55; (2) aligning the aperture in sidewall 28 with the aperture in sidewall 28 of another conventional metal electrical box 21 (not shown); and (3) passing screw 55 through both apertures to connect the abutting conventional metal electrical boxes together and form a multiple gang electrical box.

When conventional metal electric box 21 is disposed on bracket 57, the head of screw 53 abuts against leg 16 such that side wall 26 is spaced from leg 16. To keep conventional metal electrical box 21 from tilting due to the head of screw 53, nub 58 is formed of a height sufficient to space conventional electrical box 21 a distance from leg 16 equal to the thickness of the head of screw 53 such that sidewall 26 is maintained parallel to leg 16.

Figure 6:
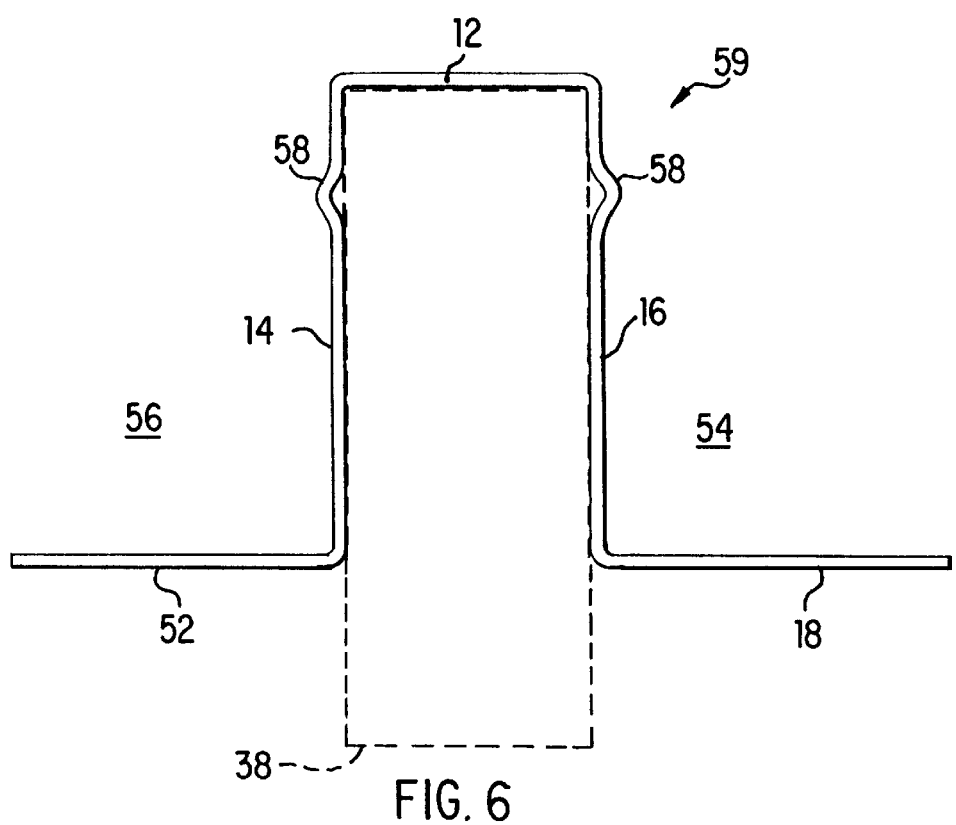
FIG. 6 is a modified embodiment of the bracket shown in FIG. 3 adapted to accommodate two conventional metal electrical boxes.

FIG. 6 shows a bracket 59, which is substantially identical to bracket 10' discussed above. However, bracket 59 includes two nubs 58 one disposed on each of legs 14 and 16 and which are identical to nubs 58 discussed above.

Referring now to FIGS. 7–10, another embodiment of the present invention is shown. In accordance with this embodiment, a bracket 60 is adapted to mount two conventional electrical boxes 64 and 65 in opposing directions such that the open end 70 of the first electrical box 64 is accessible on a first side of a wall and the open end 72 of the second electrical box 65 is accessible on a second side of the wall, opposite to said first side. With the present invention only a single bracket 60 is needed to mount both electrical boxes 64 and 65. Thus, labor and cost associated with installing two electrical boxes on opposing sides of one wall is reduced.

Electrical boxes 64 and 65 are similar to electrical box 20 discussed above, however, protrusions 34 are disposed on the interior surface of top and bottom walls 22 and 24 rather than on the exterior surface thereof. Because protrusions 34 are disposed in the interior of electrical boxes 64 and 65, they consume some of the interior space. Depending upon the electrical component being mounted within the electrical box and the electrical codes for a particular region of the country, a certain amount of air flow is required within an electrical box. When protrusions 34 are disposed on the interior surface of the electrical box they naturally take up some of the interior space of the electrical box and reduce the amount of air flow. Accordingly, to meet the same air flow standards or requirements, the overall volume of each electrical box 64 and 65 needs to be larger than the overall volume of an electrical box with protrusions formed on the exterior (as discussed above). Preferably, the volume of each electrical box 64 and 65 is twenty two cubic inches.

Bracket 60 is similar to bracket 10' discussed above, however, the second leg 62 of bracket 60 has a length substantially less than the length of second leg 16 of bracket 10'. Electrical boxes 64 and 65 are mounted on first and second flanges 18 and 18', respectively of bracket 60 by rivets 68 such that open end 70 of electrical box 64 faces in a first direction, and open end 72 of electrical box 65 faces in a second direction different from and opposite to the first direction. Alternatively, it is within the scope of the present invention to configure bracket 60 such that electrical boxes 64 and 65 may be mounted on a corner for example, where two wall surfaces connect at an angle of 90°. In this embodiment (not shown), bracket 60 would be configured such that first opening 70 of electrical box 64 faces in a first direction and opening 72 of electrical box 65 faces in a second direction perpendicular to the first direction.

Figure 10:
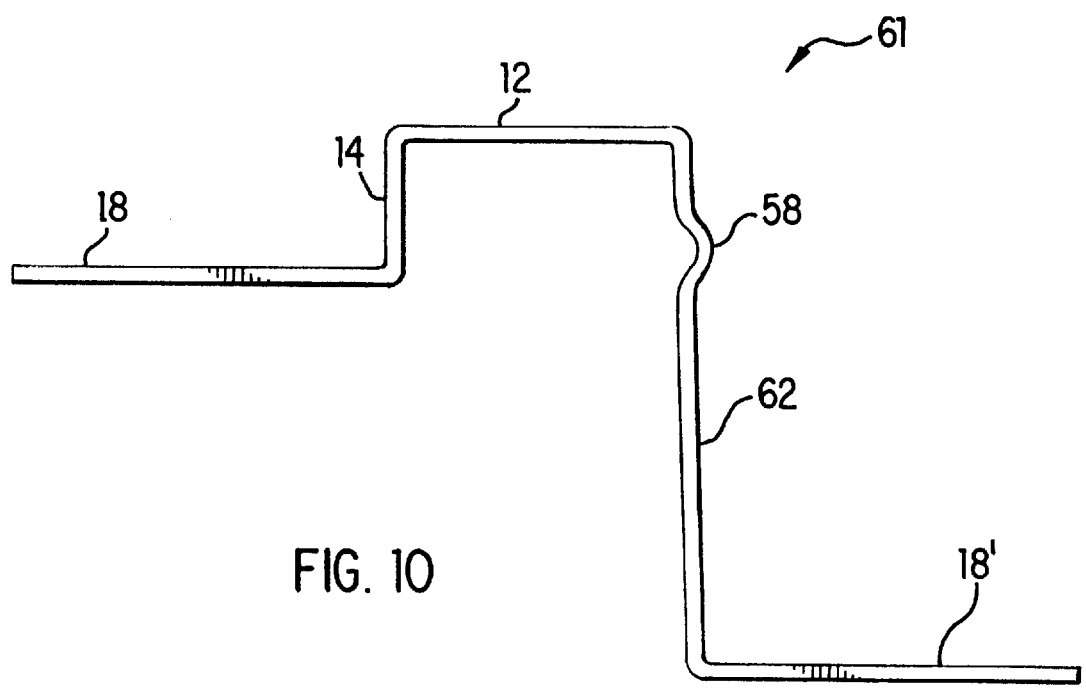
FIG. 10 is a modified embodiment of the bracket shown in FIG. 9 adapted to accommodate a conventional metal electrical box.

FIG. 10 shows a bracket 61 which is substantially identical to bracket 60. However, bracket 61 includes a nub 58 which is identical to nub 58 discussed above for mounting a conventional metal electrical box 21 to bracket 61.

Figure 11:
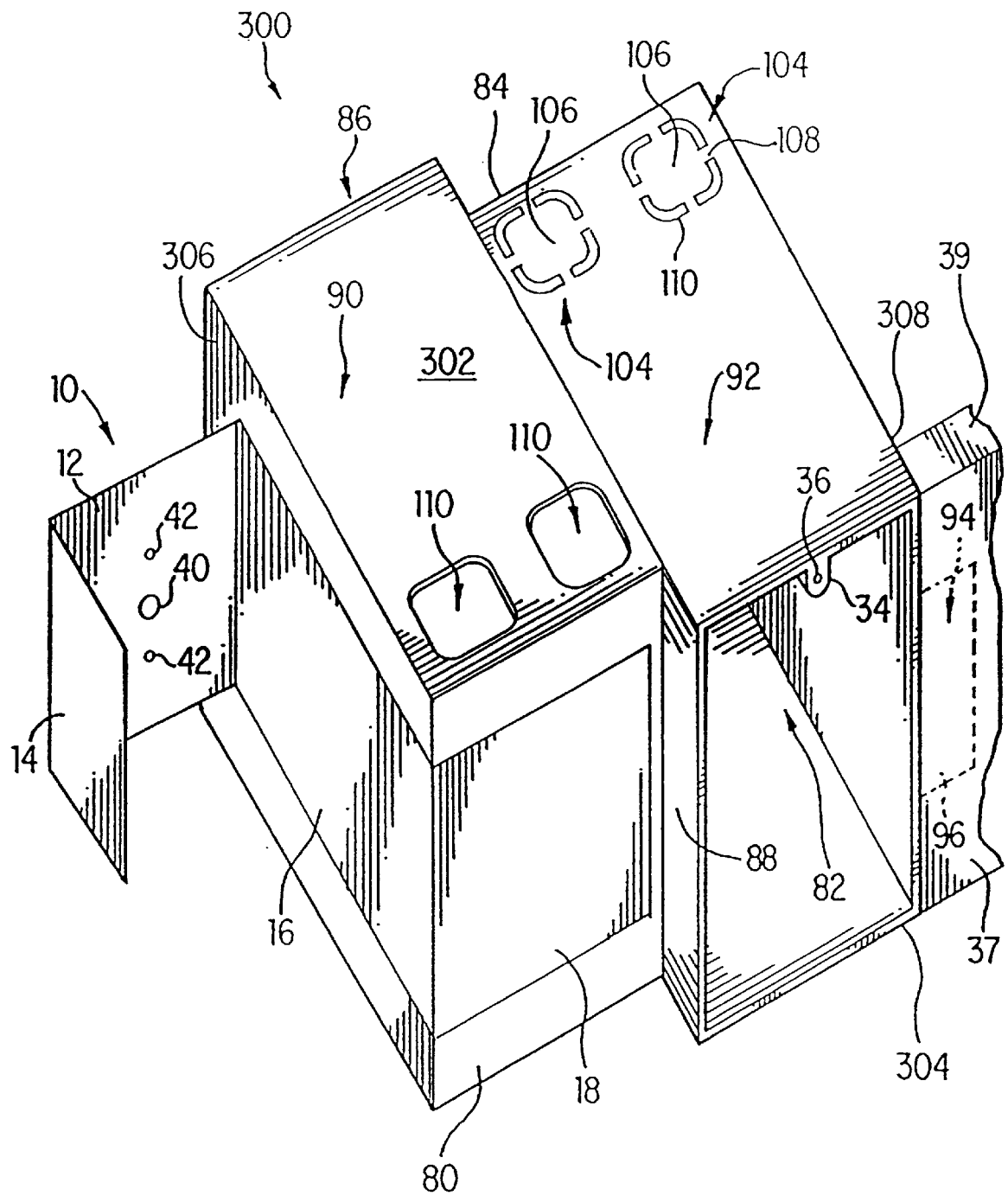
FIG. 11 is a rear perspective view of the bracket as shown in FIG. 1 with dual sided electrical box in accordance with the present invention mounted thereon.
Figure 12:
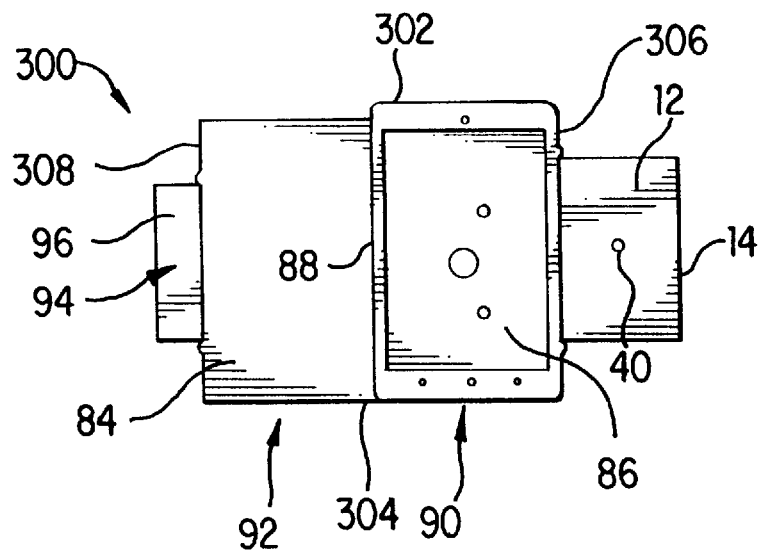
FIG. 12 is a front elevational view of the bracket and electrical box of FIG. 11.
Figure 13:
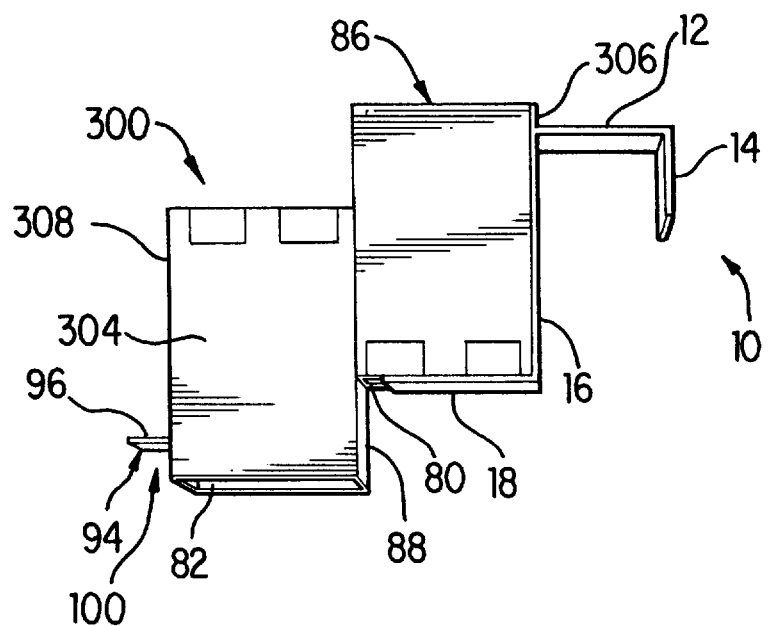
FIG. 13 is a top plan view of the bracket and electrical box of FIG. 11.

FIGS. 11–13 show yet another embodiment of the present invention including a bracket 10, as discussed above, and an electrical box shown generally at 300. Electrical box 300 is uniquely configured to include a first chamber 90 and a second chamber 92 which extend in opposite directions to permit electrical components to be disposed on opposite sides of a single wall. Electrical box 300 is generally box shaped and includes a top wall 302, a bottom wall 304, a first side wall 306, a second side wall 308 opposite thereto. A front wall 80 including a front opening 82 is formed between side walls 306 and 308 A rear wall 84 including a rear opening 86 is disposed opposite to front wall 80. An interior wall 88 separates chambers 90 and 92. As shown, front wall 80 and rear wall 84 have a stepped arrangement and are therefore, non-planar. Walls 302, 304, 306, 80 and 84, of, electrical box 300, are of substantially a same thickness. Interior wall 88 is twice as thick as the other walls. Interior wall 88 may include an opening (not shown) for the passage of electrical wires therethrough. Front opening 82 faces in a first direction and rear opening 86 faces in a second direction opposite to the first direction.

As shown, electrical box 300 is monolithic and formed by molding for example. Alternatively, electrical box 300 may comprise two or more independent electrical boxes connected together. Electrical box 300 is shown mounted on bracket 10 in the manner discussed above. In the alternative, electrical box 300 may be mounted on any one of brackets 10', 60 or 61, alone or in combination with one or more additional electrical boxes.

Top wall 304 of electrical box 300 includes four pop-outs shown generally at 104. Pop-outs 104 include a central disc 106 and four strips 108 which hold central disc 106 in opening 110 formed by top wall 304. The purpose of opening 110 is to provide access for wires or other electrical components through top wall 302. When strips 108 are broken, disc 106 is removed leaving only opening 110 through which wires, for example, may pass into chambers 90 and 92.

Figure 24:
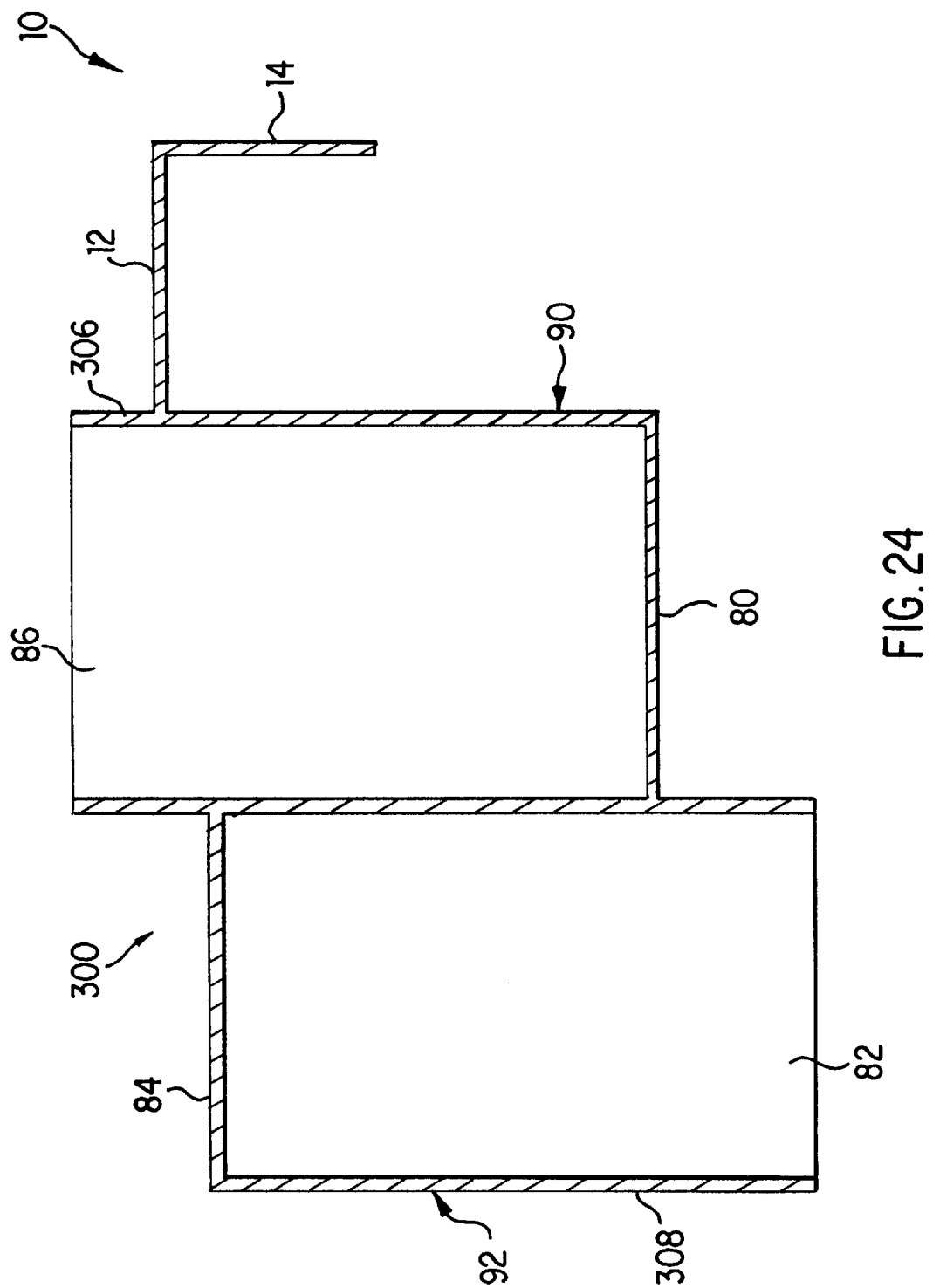
FIG. 24 is a cross-sectional view of a monolithically molded bracket and electrical box.

Second side wall 308 includes a stationary positioning tab, shown generally at 94, to prevent electrical box 300 from shifting once installed. Tab 94 is a flat, generally square or rectangular strip of material such as metal, bent at a right angle. One portion of tab 94 (not shown) is connected by a screw or adhesive for example to the exterior surface of second side wall 308, proximate to front opening 82 of electrical box 300. In the alternative, tab 94 may be integrally molded with electrical box 300. The other portion 96 of tab 94 extends from second side wall 308 perpendicular thereto. An area, shown generally as 100 is defined by second side wall 308 and portion 96 of tab 94. Area 100 is approximately one half square inches. In use, an edge of a drywall sheet is disposed in area 100 such that the interior side of drywall sheet abuts against portion 96 of tab 94. By disposing the edge of the drywall sheet in area 100, electrical box 300 is prevented from shifting or moving significantly when the wall settles and shifts. Tab 94 is particularly beneficial when heavy or large electrical boxes, such as multiple gang electrical boxes, are used which are heavier and larger and, due to gravity, have a greater tendency to shift or move. FIG. 24 illustrates another electrical box 300 comprising a first chamber 90 and a second chamber 92 which extends in opposite directions to permit electrical components to be disposed on opposite sides of a single wall. The bracket and box combination of FIG. 24 varies from that of FIG. 11 in that the box and the bracket are monolithically molded from plastic, for example, using conventional molding techniques. Because the box and bracket are molded as a single unit, second leg 16 and flange 18 of bracket 10 are not necessary and are, therefor, omitted. Electrical box 300 is easily mounted to the wall stud by positioning the stud between first leg 14 and first side wall 306 of first chamber 90. Like the bracket of FIG. 1, first leg 14 of the bracket shown in FIG. 24 is biased toward fist side wall 306 of box 300 to securingly receive the stud of the wall.

Figure 14:
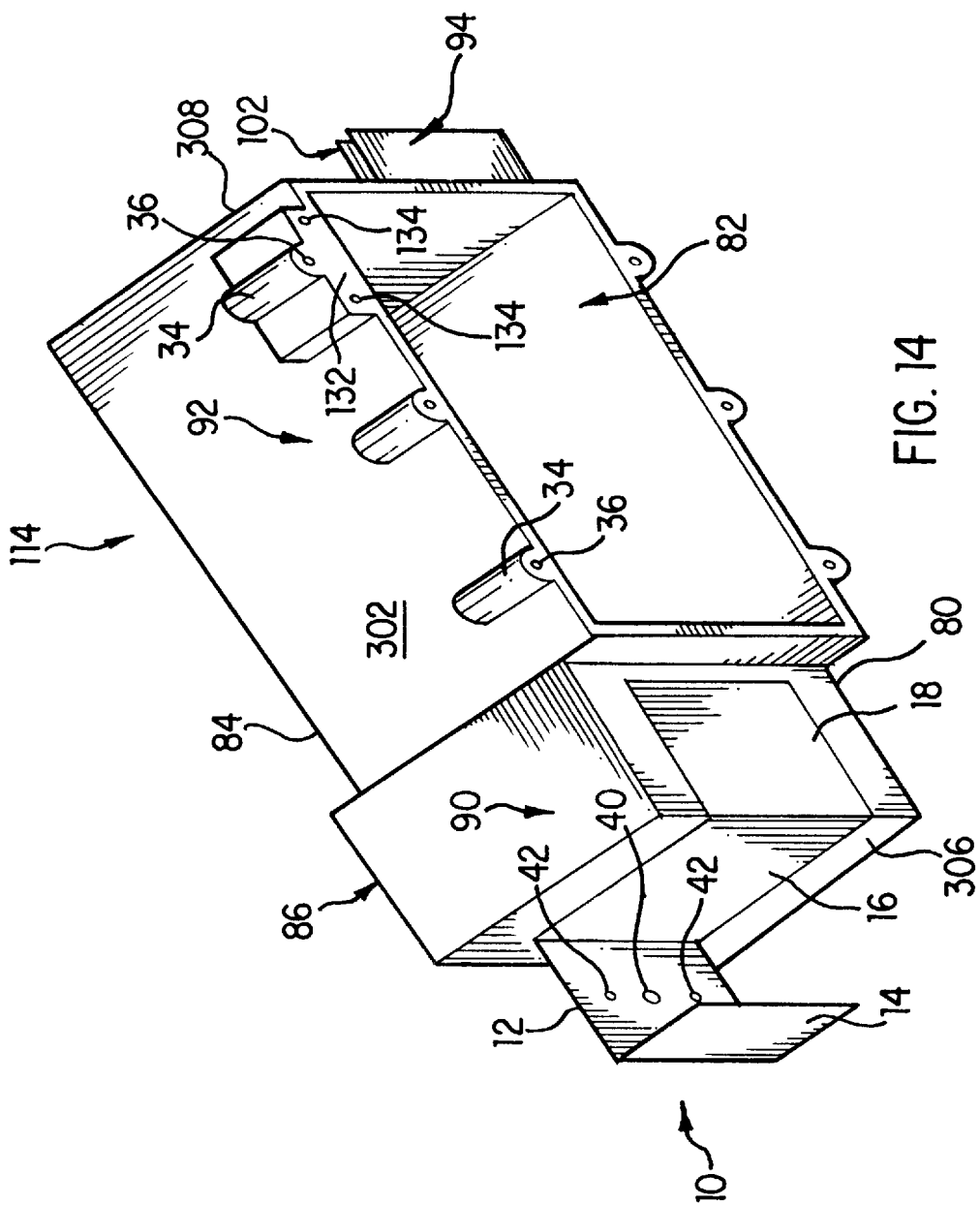
FIG. 14 is a rear perspective view of a modified embodiment of the present invention shown in FIG. 11 with one side of the dual sided electrical box being multiple-gang.
Figure 15:
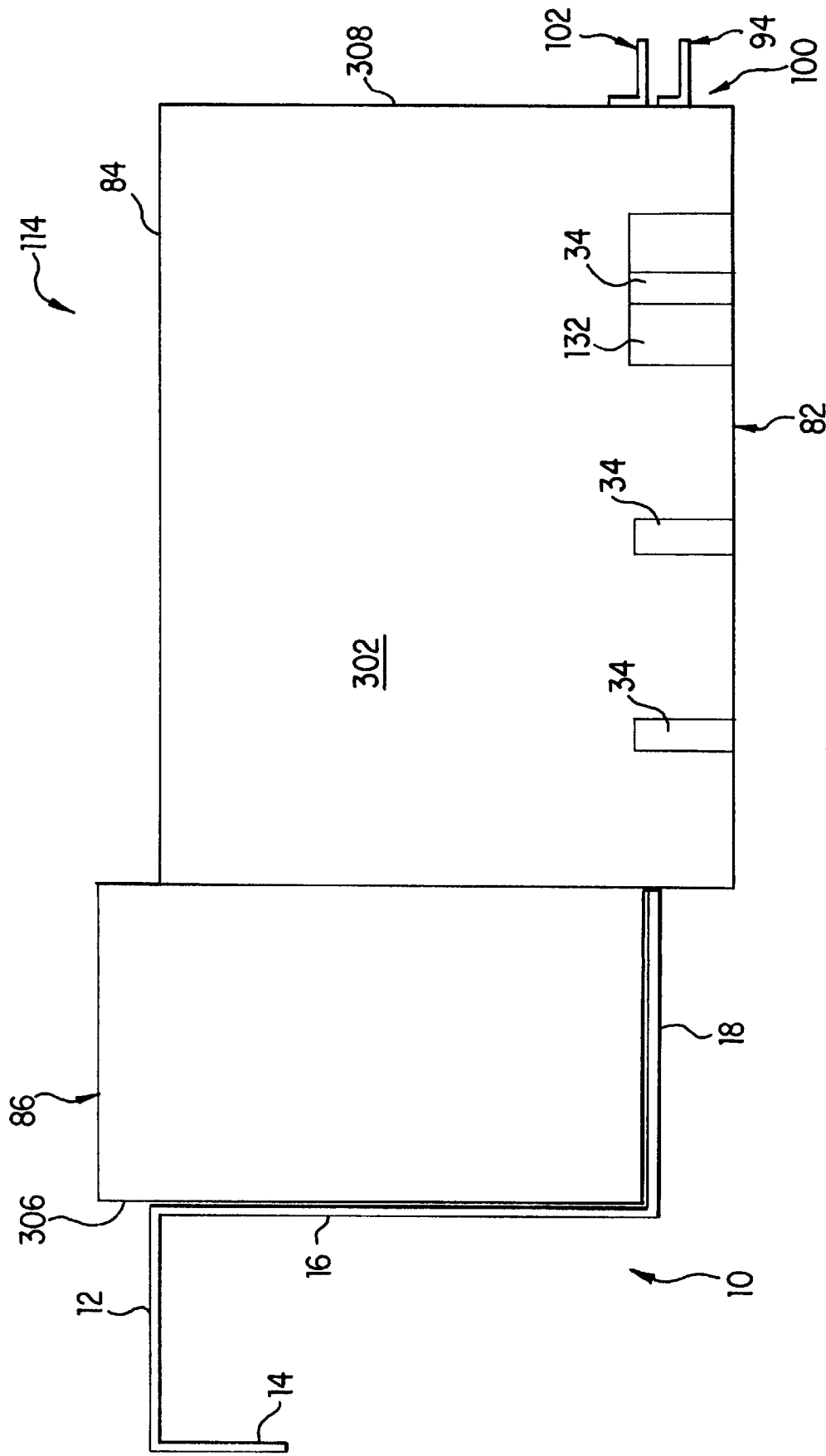
FIG. 15 is a top plan view of the bracket and electrical box of FIG. 14.

Referring now to FIGS. 14 and 15, another embodiment of the present invention is shown. This embodiment is similar to the embodiment shown in FIGS. 11–13, but includes a multiple ganged electrical box shown generally at 114. Electrical box 114 also includes a second stationary positioning tab 102, similar to first stationary positioning tab 94, discussed above. As discussed above, first tab 94 is positioned on side wall 308 of electrical box 114 about one half inch back from front opening 82 to accommodate a drywall sheet 39, which is generally about one half inch thick, in area 100. Second tab 102 is positioned directly behind tab 94, three-quarters of an inch back from front opening 82. Second tab 102 is positioned to accommodate a plaster wall, which is generally three-quarters of an inch thick, in area 100. In use, an installer may simply break off one of tabs 94 and 102, depending upon the type of wall in which the electrical box is being installed. Tabs 94 and 102 are broken off by breaking the screw, adhesive or plastic holding tabs 94 and 102 onto electrical box 114. Also shown in FIGS. 14 and 15 is a platform 132 formed on top wall 302 of electrical box 114. Two apertures 134 are disposed in platform 132 for mounting adjustable positioning tab 142 shown in FIGS. 22 and 23 and discussed in detail below.

Figure 17:
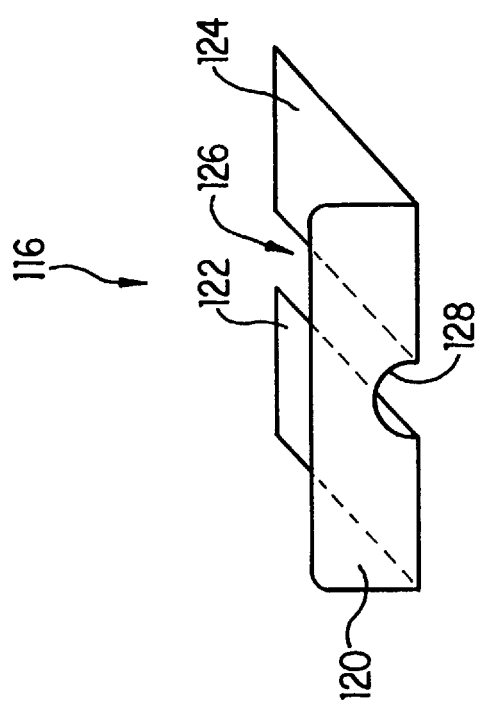
FIG. 17 is a front perspective view of the adjustable positioning tab shown in FIG. 16.
Figure 19:
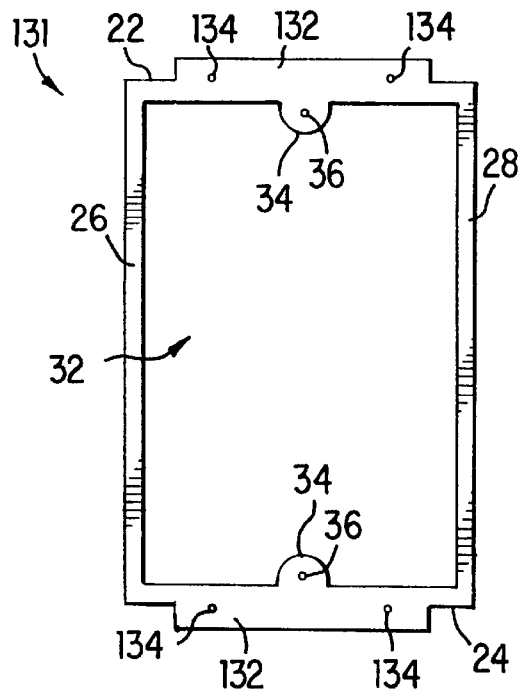
FIG. 19 is a front view of a electrical box adapted for receiving the adjustable positioning tab of FIG. 18.

Referring now to FIGS. 16 and 17, an alternate embodiment of a multiple ganged electrical box with an adjustable positioning tab is shown generally at 118. Electrical box 118 is similar to electrical box 20 discussed above, however, it includes an adjustable positioning tab shown generally at 116. In addition, slots 129 and 133 are formed in peripheral edge 130 of electrical box 118. Slots 129 and 133 are configured to receive adjustable positioning tab 116 for preventing shifting of box 118. As best seen in FIG. 17, tab 116 includes a first portion 120 extending in a first direction and second and third portions 122 and 124 extending in a second direction which is perpendicular to the first direction. Tab 116 also includes a contiguous space shown generally at 126 formed between portions 122 and 124. End 128 of space 126 is curved. Second and third portions 122 and 124 are frictionally disposed in slots 129 and 133, respectively, and protrusion 34 of electrical box 118 is disposed in curved end 128. First portion 120 of tab 116 abuts against an exterior side of the drywall sheet. Although not shown, first portion 120 may include apertures to receive nails or screws to connect first portion 120 to the drywall sheet.

After electrical box 118 and the drywall sheet are installed, the main body of electrical box 118 is inaccessibly disposed behind the drywall sheet and only the open end of electrical box 118 passes through the drywall sheet for access by the installer. In the present invention, by disposing slots 129 and 133 on peripheral edge 130, slots 129 and 133 remain exposed and accessible after the drywall sheet is installed. Therefore, tab 116 may be disposed in (or removed from) slots 129 and 133 after the drywall sheet is installed. Conventionally, a tab would be mounted on an exterior surface of the electrical box prior to installation of the drywall sheet.

Figure 18:
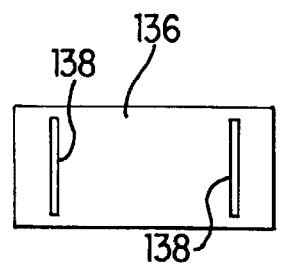
FIG. 18 is a modified embodiment of an adjustable positioning tab in accordance with the present invention.
Figure 20:
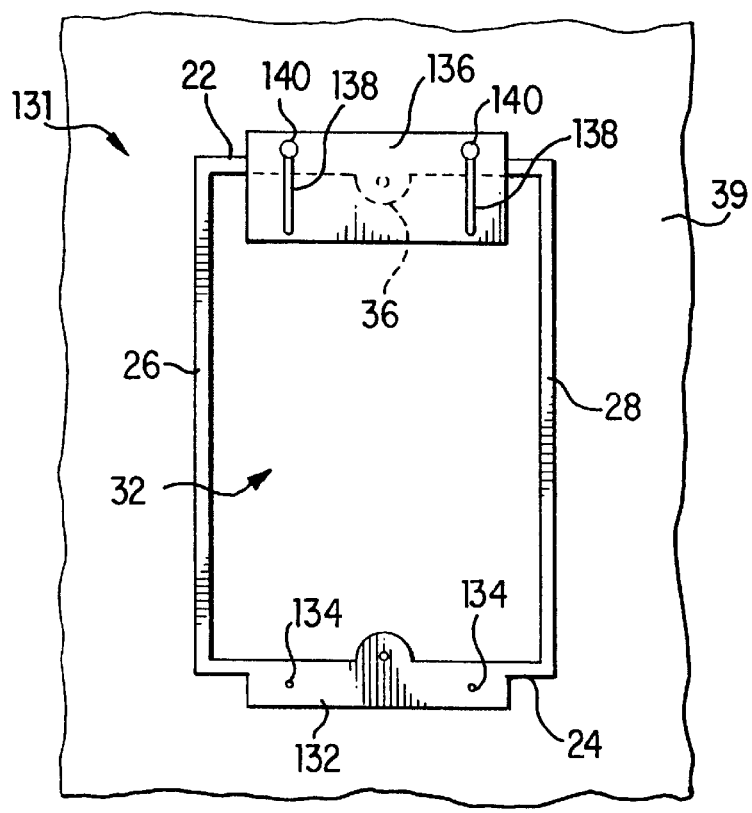
FIG. 20 is a front view of the electrical box shown in FIG. 19 with the adjustable positioning tab of FIG. 18 mounted thereon in a retracted position.

FIGS. 18–21 show a modified embodiment of the adjustable positioning tab shown in FIGS. 16 and 17. In particular, FIG. 18 shows an adjustable positioning tab 136 having two parallel, spaced apart slots 138. Tab 136 is generally rectangular-shaped and is formed of a thin piece of sheet metal or plastic having a width less than the width of electrical box 20 and a height sufficient to extend between electrical box 20 and a drywall sheet. Tab 136 is mounted on electrical box 131 as shown in FIG. 20. Electrical box 131 is similar to electrical box 20 discussed above, however, it includes a platform 132 on both top wall 22 and bottom wall 24. In addition, electrical box 131 is of the type having a protrusion 34 disposed on an interior side of both top wall 22 and bottom wall 24.

Platform 132 includes a raised portion having a thickness sufficient to include apertures 134, which are adapted to receive screws or nails. In use, tab 136 is connected to platform 132 by screws 140 which extend through slots 138 and apertures 134. The tightness of screws 140 may be adjusted such that tab 136 may slide up and down when screws 140 are loose and remain in a fixed position when screws 140 are tightened. FIG. 20 shows tab 136 in a retracted position with screws 140 tightened to hold tab 136 in this position. This retracted position may be used during storage and installation of electrical box 131 and a drywall sheet. Screws 140 may then be loosened such that tab 136 may slide to an extended position shown in FIG. 21. Tab 136 may be fixed in this position by tightening screws 140. In the extended position, tab 136 abuts against the exterior side of a drywall sheet. Additional screws (not shown) may be passed through slots 138 when tab 136 is in an extended position to connect tab 136 to a drywall sheet.

FIGS. 22 and 23 show a modified embodiment of the adjustable positioning tab 136 shown in FIGS. 18–21 for mounting of an electrical box shown generally at 151. Electrical box 151 is similar to electrical box 20 discussed above; however, electrical box 151 includes platform 132 between exteriorly disposed protrusions 34 and top and bottom walls 22 and 24. In this embodiment, an adjustable positioning tab 142 includes a notch 144 to accommodate exteriorly disposed protrusions 34. In particular, notch 144 allows protrusion 34 to be accessed when tab 142 is in an extended position.

While adjustable positioning tabs 136 and 142 are shown on single gang electrical boxes 131 and 151, adjustable positioning tabs 136 and 142 may be disposed on multiple gang electrical boxes. For example, tab 142 may be mounted on platform 132 of multiple gang electrical box 114. In multiple gang construction, and as shown in FIG. 14, platform 132 is preferably formed on a gang of electrical box 114 furthest from bracket 10. This location is the preferred location to provide additional support for longer and heavier multiple gang electrical box 114. Moreover, when tab 142 is disposed on platform 132, tab 142 and one of tabs 94 and 102 (shown in FIG. 14) act in concert to support electrical box 114 by capturing a drywall sheet between tab 142 and one of tabs 94 and 102.

The preferred embodiment was chosen and described in order to best explain the principles of the present invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A device for mounting an electrical component, comprising:

a bracket having a base, a first leg including a flange which extends form said first leg in a substantially perpendicular manner, and a second leg; and an electrical box for receiving at least one electrical component, said electrical box being attached to said flange of said first leg of said bracket;

wherein said bracket is adapted to be attached to conventional electrical boxes of various configurations and constructions and wherein said first leg and said second leg of said bracket are biased toward each other to securingly receive a wall stud therebetween and said bracket is slidably adjustable along a length of the wall stud when the wall stud is received between said first leg and said second leg of said bracket.

2. A device according to claim 1, wherein said electrical box has a first chamber and a second chamber, said first chamber having a first opening facing in a first direction, said second chamber having a second opening facing in a second direction different from said first direction.

3. A device according to claim 2, wherein said first direction opposes said second direction.

4. A device according to claim 2, wherein said first chamber abuts said second chamber.

5. A device according to claim 2, further comprising:
an edge formed on a side of said electrical box and formed at a periphery of at least one of said first and second openings of said first and second chambers; and
an adjustable positioning tab having a flat plate-like configuration including first and second opposed planar surfaces, wherein one of said first and second opposed planar surfaces is disposed on said edge such that said adjustable positioning tab is disposed substantially perpendicular to said side.

6. A device according to claim 1, further comprising:
an aperture centrally disposed on said base.

7. A device according to claim 1, further comprising:
a slot formed in said electrical box, and
an adjustable positioning tab including a tab base and a tab leg, wherein said tab base is substantially perpendicular to said tab leg, and
wherein said tab base of said adjustable positioning tab is disposed within said slot.

8. A device according to claim 1, further comprising:
a stationary positioning tab, said stationary positioning tab being disposed on a side of said electrical box.

9. A device according to claim 1, wherein said electrical box has a first opening facing in a first direction, and
wherein a second electrical box is disposed adjacent said second leg, said second electrical box having a second opening facing in a second direction different from said first direction.

10. A device according to claim 9, wherein said second leg includes a second flange disposed substantially parallel to said base, and wherein said second electrical box is disposed on said second flange.

11. A bracket for mounting an electrical box, comprising:
a base, a first leg including a flange which extends from said first leg in a substantially perpendicular manner, and a second leg,
wherein said flange is adapted to receive the electrical box and said first leg and said second leg are biased toward each other to securingly receive a wall stud therebetween and the bracket is slidably adjustable along a length of the wall stud when the wall stud is received between said first leg and said second leg of the bracket.

12. A bracket according to claim 11, further comprising:
an aperture centrally disposed on said base.

13. A bracket according to claim 11, wherein said second leg includes a second flange extending substantially parallel to said base and wherein said second flange is adapted to receive a second electrical box.

14. A bracket according to claim 11, wherein said second leg includes a second flange extending substantially parallel to said base and wherein said second flange is adapted to receive a second box,
wherein said first leg has a first length and said second leg has a second length shorter than said first length.

15. An electrical box for mounting electrical components on opposite sides of a single wall, comprising:
a first chamber having at least a first top wall, a first bottom wall, a first back wall and a first open front facing in a first direction; and
a second chamber having at least a second top wall, a second bottom wall, a second back wall and a second open front facing in a second direction opposite to said first direction;
wherein said first open front of said first chamber lies in a first plane and said second back wall of said second chamber lies in a second plane which is offset from said first plane, such that said first open front of said first chamber opens and extends to a first side of the single wall and said second open front of said second chamber opens and extends to a second side opposite to the first side of the single wall to enable the mounting of electrical components on said first and second sides of the single wall when the box is attached to a single wall stud of the single wall, wherein the box is slidably adjustable along a length of the single wall stud.

16. An electrical box according to claim 15, wherein said first chamber abuts said second chamber.

17. An electrical box according to claim 15, wherein said first chamber and said second chamber are dimensioned to accommodate standard electrical components.

18. A molded, one-piece unit for mounting an electrical component to a wall stud, comprising:
a chamber for housing the electrical component, said chamber including a top wall, a bottom wall, a first side wall having a first front edge, a second side wall having a second front edge, a rear wall, and an open front; and
means for attaching the unit to the wall stud, said means comprising a base extending from said first side wall of said chamber and a first leg extending from said base, wherein said first leg of said means is biased toward said first side wall to securingly receive the wall stud therebetween and wherein the unit is slidably adjustable along a length of the wall stud when the wall stud is received between said first side wall of said chamber and said first leg of said means.

19. The unit of claim 18, wherein the unit further comprises a second chamber monolithically molded to said first chamber, said second chamber including a second chamber top wall, a second chamber bottom wall, a second chamber side wall, a second chamber rear wall and a second chamber open front.

20. The unit of claim 19, wherein said open front of said first chamber faces in a direction opposite to said second chamber open front of said second chamber.

* * * * *